US011192411B2

(12) United States Patent
Pair et al.

(10) Patent No.: US 11,192,411 B2
(45) Date of Patent: Dec. 7, 2021

(54) TRAILER TONGUE STAND WITH SECURE COUPLER (71) Applicants: Kevin D. Pair, Apache, OK (US); John E. Fortner, Lawton, OK (US)

(72) Inventors: Kevin D. Pair, Apache, OK (US); John E. Fortner, Lawton, OK (US)

(*) Notice: Subject to any disclaimer, the term of this patent is extended or adjusted under 35 U.S.C. 154(b) by 117 days.

(21) Appl. No.: 16/825,325

(22) Filed: Mar. 20, 2020

(65) Prior Publication Data
US 2021/0291602 A1    Sep. 23, 2021

(51) Int. Cl.
*B60D 1/60* (2006.01)
*B60D 1/02* (2006.01)
*B60D 1/06* (2006.01)

(52) U.S. Cl.
CPC .............. *B60D 1/60* (2013.01); *B60D 1/025* (2013.01); *B60D 1/06* (2013.01); *B60D 1/605* (2013.01)

(58) Field of Classification Search
CPC ................................. B60D 1/60; B60D 1/605
See application file for complete search history.

(56) References Cited

U.S. PATENT DOCUMENTS

| 2,917,322 A | 10/1957 | Fuschi |
| 3,605,457 A | 9/1971 | Foster |
| 3,796,074 A | 3/1974 | Vik |
| 3,857,575 A * | 12/1974 | Lee ................ B60D 1/66 280/1 |
| 4,373,303 A * | 2/1983 | Stratichuk .......... E04B 1/34347 52/165 |
| 5,154,440 A | 10/1992 | Dolan et al. |
| 6,406,052 B1 * | 6/2002 | Bale .................. B60D 1/06 280/507 |
| 6,722,686 B2 | 4/2004 | Koh |
| D615,462 S | 5/2010 | Barrette |
| 11,084,653 B1 * | 8/2021 | Weber ................ B65F 1/141 |

FOREIGN PATENT DOCUMENTS

| CN | 2934499 Y | * | 8/2007 | |
| EP | 0105621 A2 | * | 4/1984 | .............. B60D 1/60 |
| GB | 2465821 A | * | 6/2010 | .............. B60R 25/00 |
| WO | WO-9515864 A1 | * | 6/1995 | .............. B60D 1/60 |

OTHER PUBLICATIONS

FT Knox Locks; "Airstream coupler lock"; retrieved Mar. 18, 2020 from https://ftknoxlocks.com.
ETrailer; "Weigh Safe Hitch Receiver Lock"; retrieve on Mar. 12, 2020 from https://www.etrailer.com.
ETrailer; "Trailer Hitch Receiver Lock—Padlock Style"; retrieved on Mar. 12, 2020 from https://www.etrailer.com.

(Continued)

*Primary Examiner* — Kevin Hurley
(74) *Attorney, Agent, or Firm* — Robert H. Frantz (57) ABSTRACT

A trailer anti-theft device is disclosed which provides a protective coupler shell that surrounds an affixed hitch ball, and which surrounds a received hitch coupler. The protective coupler shell can be selectively disengaged, such as by unlocking, to allow access to and removal of the hitch coupler from the affixed hitch ball.

8 Claims, 11 Drawing Sheets

(56) References Cited

OTHER PUBLICATIONS

Jamestown Distributors; "Trailer Components Terminology"; retrieved on Mar. 13, 2020 from https://www.jamestowndistributors.com.
Northern Tool; "Equipment Lock Co. Ball and Ring Hitch Lock, Model# BRHL"; retrieved on Mar. 16, 2020 from https://www.northerntool.com.
Proven Industries; "Model 2178"; retrieved on Mar. 16, 2020 from http://www.provenlocks.com.
ETrailer; "Trailer Hitch Receiver Locks"; retrieved Mar. 12, 2020 from https://www.etrailer.com.

* cited by examiner

TRAILER TONGUE STAND WITH SECURE COUPLER

FIELD OF THE INVENTION

This invention relates to devices for supporting an unhitched trailer, and especially to devices to protect unhitched trailers from theft.

BACKGROUND OF INVENTION

Unhitched trailers are the target of thieves for many reasons. In many cases, the trailer is the desired loot, while in some other cases, the contents of the trailer is the desired loot. Many craftsmen, tradesmen and other professionals such as plumbers, electricians, carpenters, welders, renovators, guttering companies, roofing companies, painters, tile and flooring installers, as well as sportsmen such as car racers, collectible vehicle enthusiasts, hunters, and even food service business people use trailers as their warehouse and/or place of business. So, being the victim of a trailer theft has a two-fold impact: the loss of the trailer itself, and the loss of what it contains.

Trailer anti-theft devices, to date, include a variety of coupler locks which attempt to block access to the coupler portion of the trailer yoke, wheel locks, as well as heavy-duty chains and locks. Electronic tracking and alarm systems are also available.

SUMMARY OF THE INVENTION

A trailer anti-theft device is disclosed which provides a protective coupler shell that surrounds an affixed hitch ball, and which surrounds a received hitch coupler. The protective coupler shell can be selectively disengaged, such as by unlocking, to allow access to and removal of the hitch coupler from the affixed hitch ball.

BRIEF DESCRIPTION OF THE DRAWINGS

The figures presented herein, when considered in light of this description, form a complete disclosure of one or more embodiments of the invention, wherein like reference numbers in the figures represent similar or same elements or steps.

FIG. 13 illustrates the usage of the optional hinged break as shown in

FIG. 12.

DETAILED DESCRIPTION OF EMBODIMENT(S) OF THE INVENTION

The present inventors have recognized one or more unmet needs in the art for protecting an unhitched trailer from theft, and for providing a support for the unhitched trailer to relieve stress on commonly-used trailer jacks. The present inventors have realized that ordinary trailer jacks, which are mounted to the Y-shaped portion on the front of a trailer, which is sometimes referred to as the trailer's yoke. These trailer jacks, which may be equipped with a wheel, are used to lift the front of the trailer in order to disengage the trailer's coupler from a hitch ball on the tow vehicle. After the coupler is disengaged from the tow vehicle, the vehicle is driven away, and the trailer jack may be lowered to level the trailer for storage. The owner of the trailer may then apply one or more anti-theft devices, such as a coupler lock, chain and lock around the frame, and/or various wheel locks. The present inventors have further realized that these locking mechanisms each exhibit certain design weaknesses which can be exploited by a thief using tools such as bolt cutters, chain cutters, drills, saws and grinders. Still further, the present inventors have realized that many of the ordinary trailer jacks are not very stable and some are outright dangerous if the trailer is occupied by people, such as a camping trailer or work trailer, or if the trailer is subjected to strong winds. These jacks have been known to collapse under such loads, and even prior to collapsing, they may provide excessive lateral movement which leads to shaking of the trailer and excessive wear on other trailer components.

The present inventors, therefore, disclose several example embodiments and variation embodiments to illustrate an device which combines the function of a trailer stand and the functions of a coupler anti-theft device to yield a much stronger and much more stable trailer yoke stand having improved anti-theft characteristics.

Figure 1:
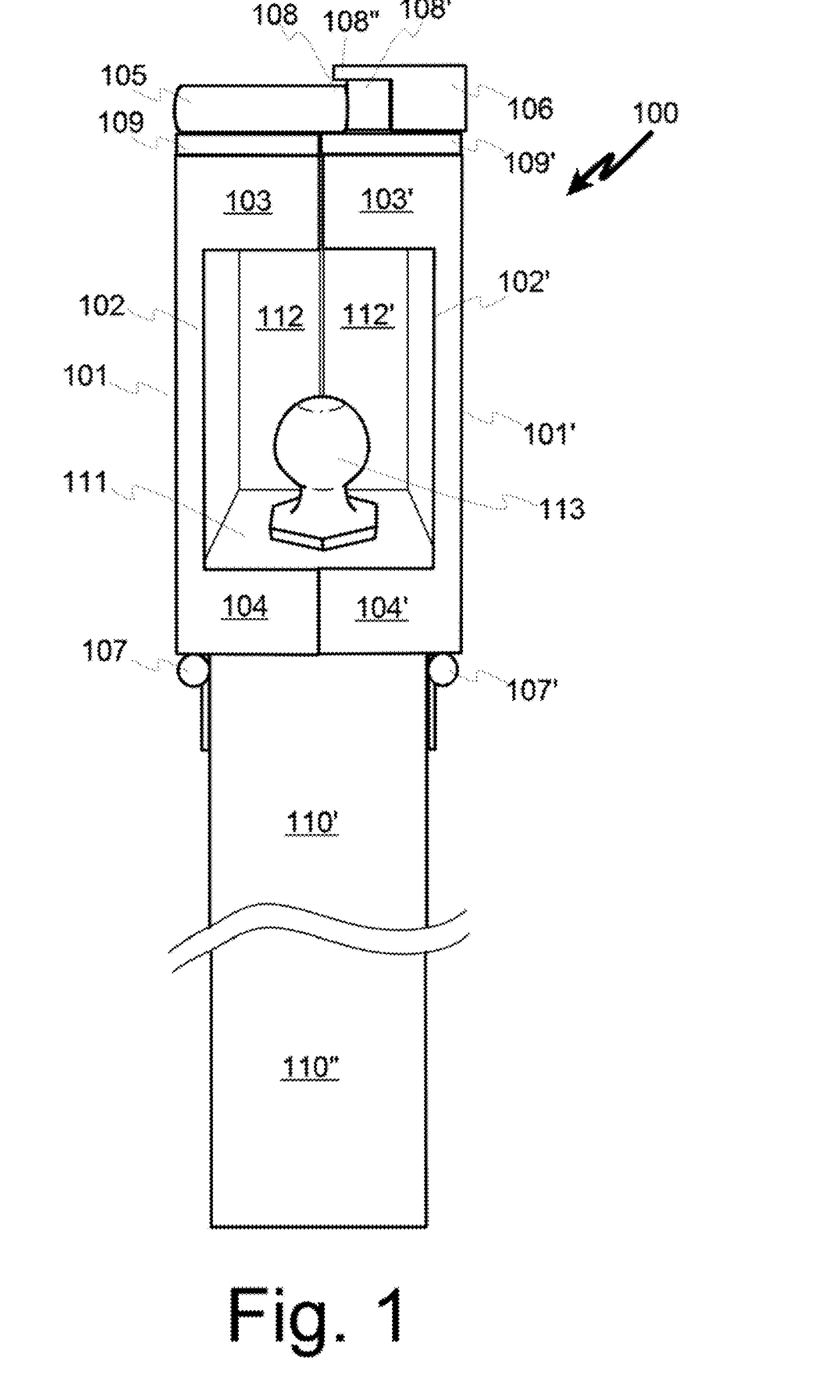
FIG. 1 provides a view of an exemplary device according to the present invention taken from the trailer coupler angle with the protective clam shell closed.

Referring not to FIG. 1, an exemplary device 100 according to the present invention is shown from the rear side of the device into which a trailer coupler is receivable. It has a protective coupler shell which surrounds the hitch ball 113 and received coupler (not shown in this configuration) on at least three sides (front, driver and passenger) and from above (top) that prevents unauthorized access to the coupler and ball while secured, and which provides mechanical support of the tongue weight of the trailer on a post portion.

This particular embodiment has a protective coupler shell having two pivoting halves 101 and 101" (driver side and passenger side, respectively) of clam shell, which defines an interior volume 112 and 112' containing a hitch ball 113 supported by a top 111 of a post. The post in this particular embodiment has an upper section 110' and a lower section 110", which may be unitary with each other, or separate sections which mate and/or secure to each other as will be discussed in more detail in the following paragraphs. In this embodiment, two hinges 107 and 107' are affixed to the post and to the clam shell halves 101 and 101' to provide the pivoting function to allow access to the hitch ball during engagement with a trailer coupler, and to protect unauthorized access to the trailer coupler when secured. Preferably, the leaves of the hinges are welded to the post and to the clam shell halves to prevent their being easily removed.

Further, in this particular embodiment 100, the rear side of the protective coupler shell has a coupler-receiving opening 102 and 102' formed by the vertical sides of the clam shell halves 101 and 101', by upper tabs 103 and 103', and by lower tabs 104 and 104'. Preferably, the passenger side, front sides, and driver's side of the clam shell halves are essentially solid, as are the tops 109 and 109'.

A locking system is shown on top of this particular example embodiment, having a tube 105 for receiving a standard hitch receiver pin (not shown in this view) and capturing 106 a mating padlock. In this embodiment, certain overlaps 108, 108' and 108" are provided to fully prevent access to the portion of the hitch receiver pin which may otherwise be exposed for cutting or drilling in the gap between the two clam shell halves.

In at least embodiment, the elements and components of the protective coupler shell and locking system are constructed using heavy duty plate metal with welding at the joints and seams. Other materials and methods of construction may be utilized as the application may warrant without departing from the spirit and scope of the present invention. The post is preferably constructing using 4" square steel tube stock of suitable strength to support the tongue weight of a particular class of trailer, and of sufficient strength and thickness to deter cutting through the post with common tools.

Figure 2:
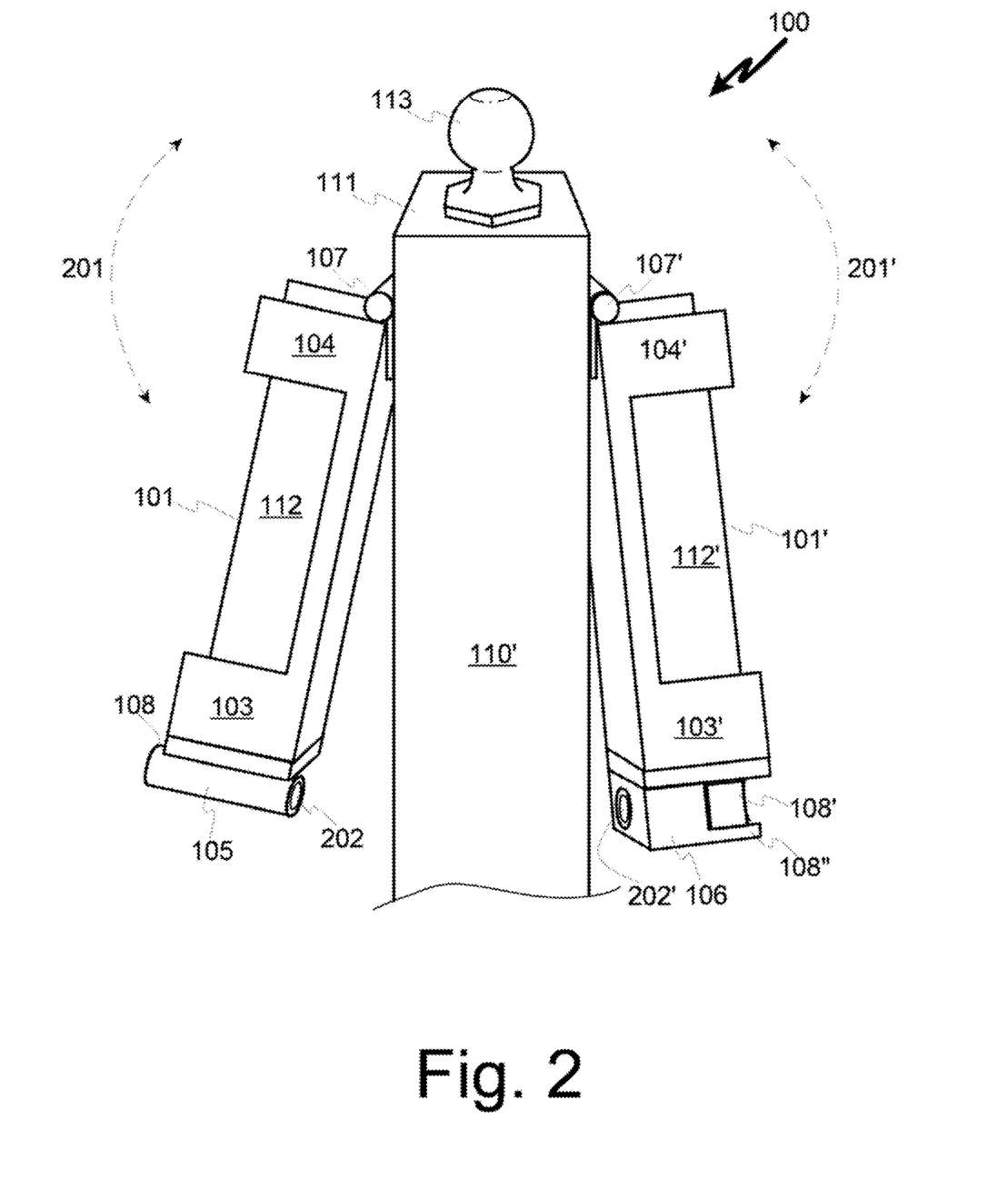
FIG. 2 provides the same perspective view as in FIG. 1 except with the protective clam shell open.

Referring now to FIG. 2, the exemplary embodiment 100 as shown in FIG. 1 is shown with the clam shell halves unlocked and splayed open, such as, in this embodiment, pivoting 201 and 201' on the hinges 107 and 107' to a downward position where they are held in place by gravity. This exposes the hitch ball 113 on top of the upper portion of the post 110' for coupling or uncoupling of a trailer. This view provides more details of the locking system, such as a key hole access port 202' for the captured padlock, and the entry end 202 of the tube 105 for receiving a standard hitch receiver pin.

Figure 15:
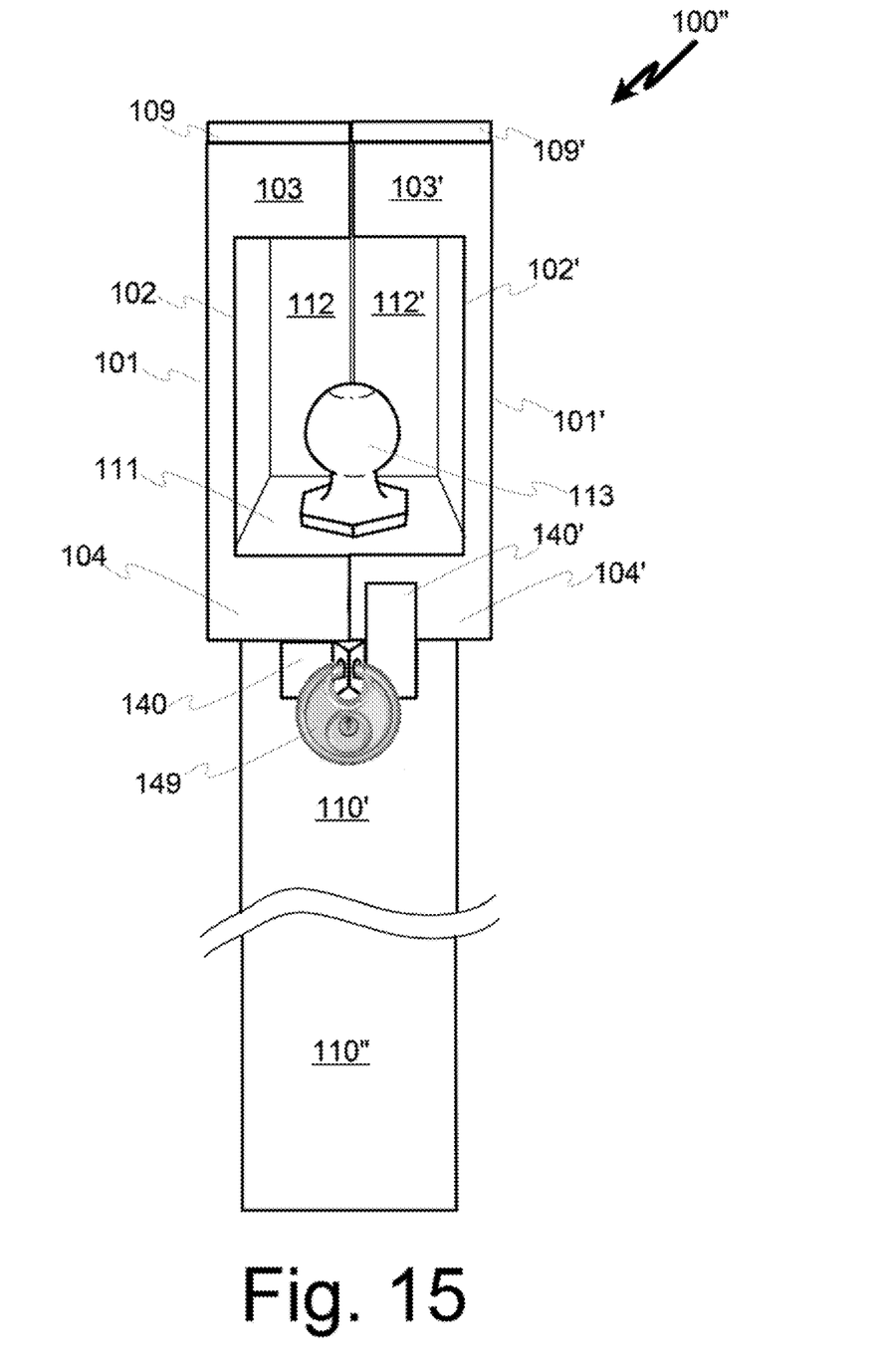
FIG. 15 shows a lift-off exemplary embodiment according to the present invention in which the hinges are omitted and the protective shell cover is retained on the post by the lock and the taps (or hasp and loop).

In other embodiments, the protective coupler shell may lift off instead of being hinged, as shown 100' in FIG. 15, may be hinged to swing open and closed in a side-to-side manner, and may have more than two components or multiple side portions which assemble in a way to create the protected interior volume of the protective shell cover to prevent unauthorized access to the hitch ball and trailer coupler.

Figure 14:
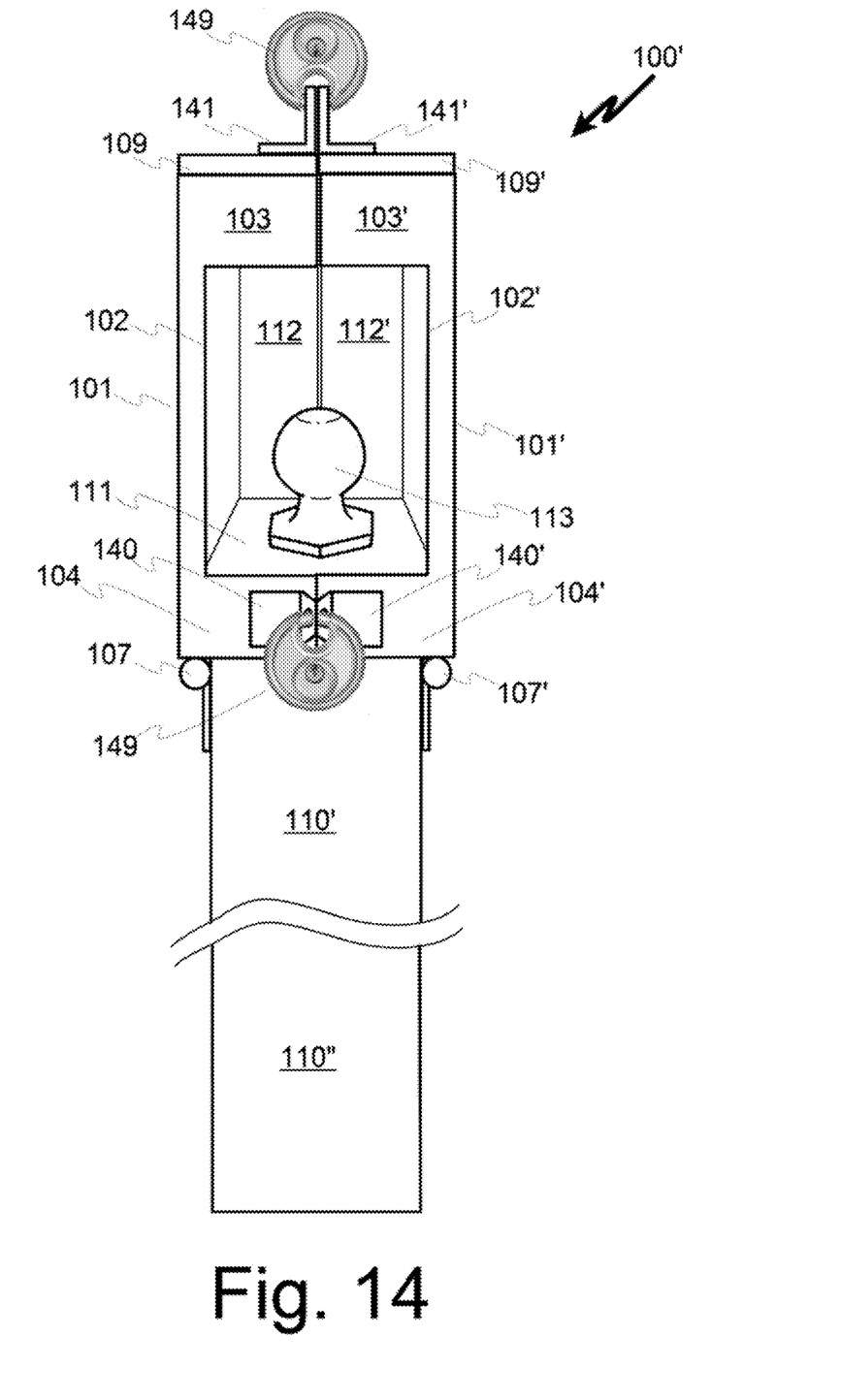
FIG. 14 illustrates another exemplary embodiment according to the present invention which uses a padlock and one or more tabs or a hasp and loop as a locking system.

In other embodiments, the locking system may be comprised of alternative lock components, such as two tabs as with aligning holes on the top 141 and 141' of the clam shell halves or on one or more of the sides 140' and 140' of the protective shell cover, through which a standard padlock 149 (without pin) can be received, such as a Diskus[™] 28/60 by ABUS, as shown in FIGS. 14 and 15.

Figure 3:
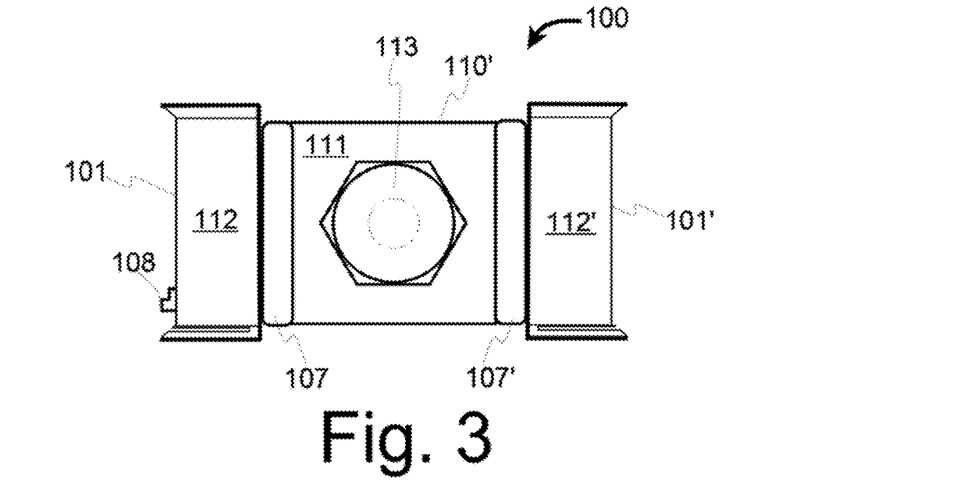
FIG. 3 provides a top-down view of the exemplary device of FIGS. 1 and 2 with the protective clam shell open.
Figure 4:
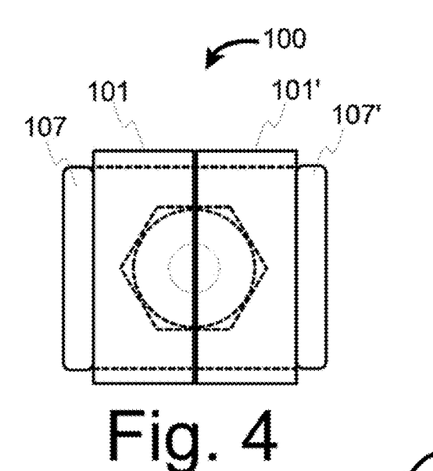
FIG. 4 provides the same top-down view of FIG. 3 except with the protective clam shell closed, also depicting the position of the hitch ball which is hidden from view in this configuration, and with the locking device omitted so as not to obscure the hitch ball visualization.

Turning to FIG. 3, the exemplary embodiment 100 of FIGS. 1 and 2 is shown from a top-down view with the protective clam shell halves splayed open. This this view, one portion of the protective overlap 108 at the mating seam-end of the hitch pin tube 202 is visible. FIG. 4 illustrates the same view as FIG. 3 except with the protective clam shell in the closed position, depicting the position of the hitch ball (in dashed lines) which is hidden from view in this configuration, with the locking system omitted so as not to obscure the hitch ball visualization. FIG. 4 shows the protective nature of how the coupler shell surrounds the trailer coupler from at least four sides: front, passenger and driver's sides.

Figure 5:
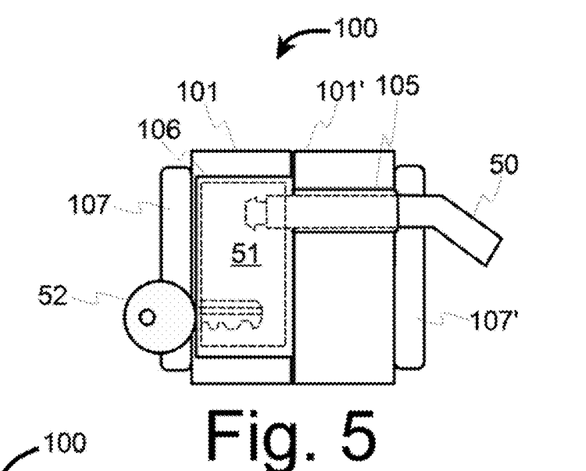
FIG. 5 illustrates the same view as FIG. 4 except with the locking device included, as well as depiction of the captured padlock-style hitch receiver pin, lock and key.
Figure 6:
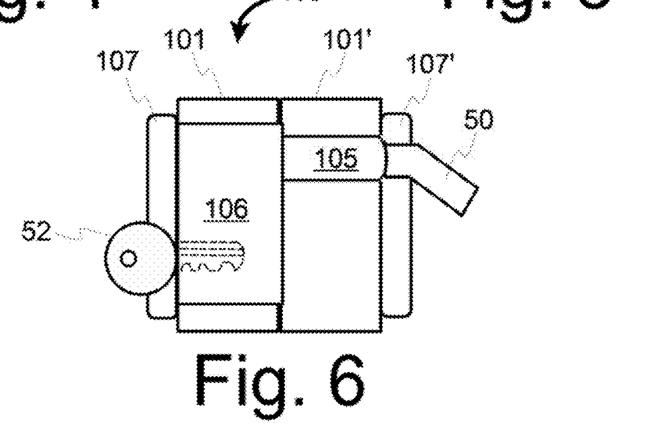
FIG. 6 sets forth the view of FIG. 5 except with the hidden elements removed from the depiction.

FIG. 5 illustrates the same view as FIG. 4 except with the elements of the exemplary locking system included, as well as inclusion of a captured padlock-style hitch receiver pin 50, lock 51 and key 52. FIG. 6 provides the same view of FIG. 5 except with the hidden elements removed from the depiction, to convey the solid perspective of this exemplary embodiment from a top-down vantage point.

Figure 7:
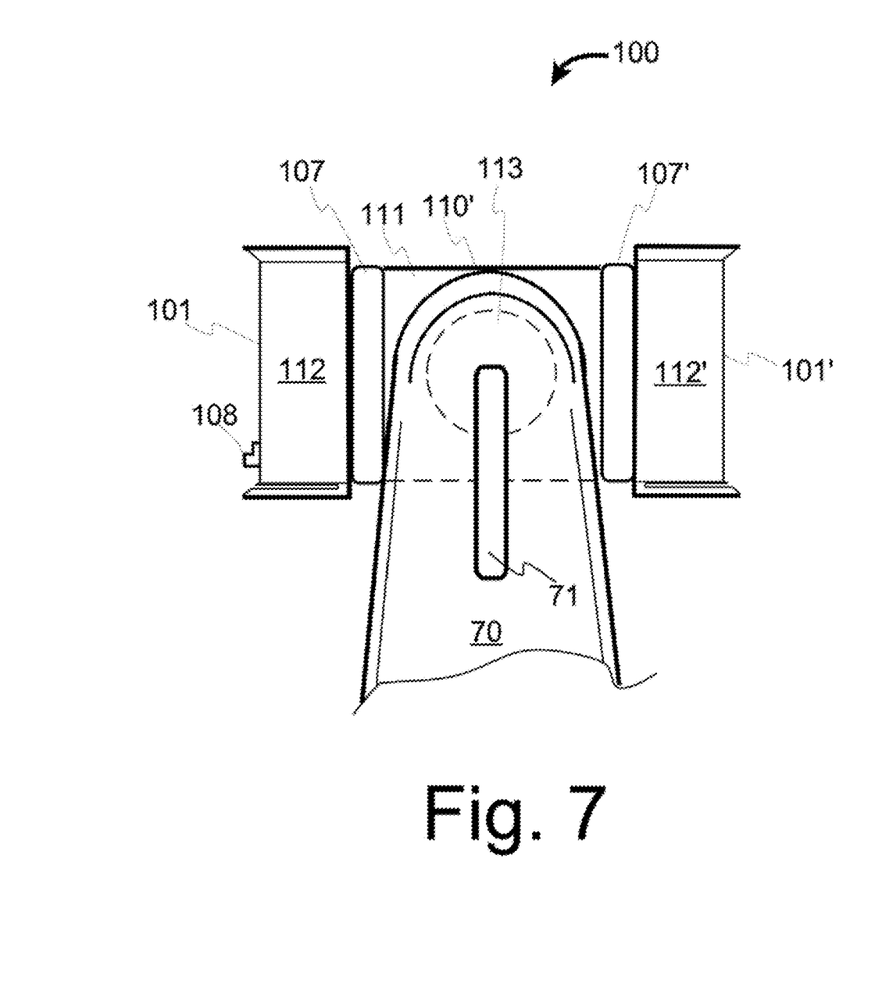
FIG. 7 illustrates a top-down view similar to that in FIG. 3, with the addition of a trailer coupler latched onto the trailer ball of the device.
Figure 8:
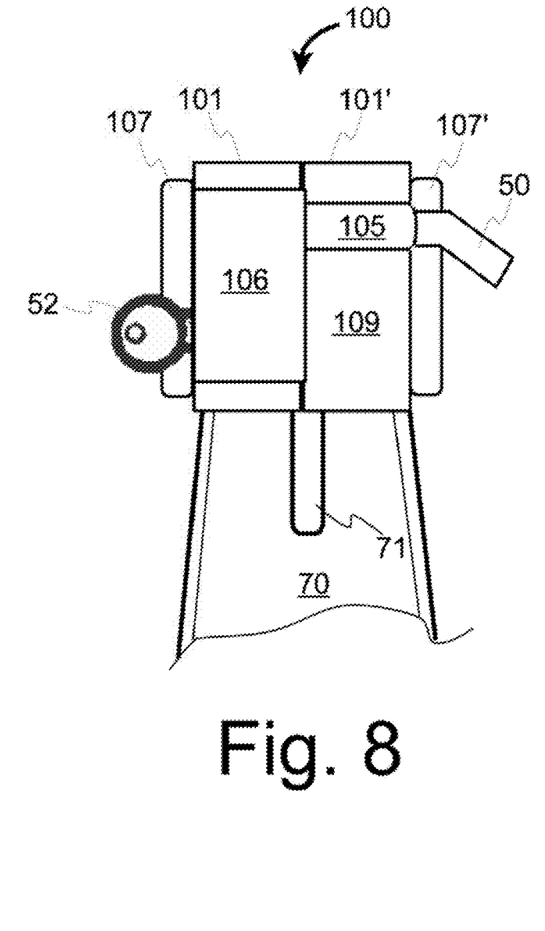
FIG. 8 combines the illustration of FIGS. 6 and 7, with the protective clam shell closed over the trailer coupler.

Referring now to FIG. 7, a top-down view similar to that in FIG. 3 is provides, however with the addition of a trailer coupler 70 latched 71 onto the trailer ball 113 of the device. FIG. 8 combines the illustration of FIGS. 6 and 7, with the protective clam shell 101 and 101' closed over and around the trailer coupler 70, thereby preventing lifting of the trailer coupler latch 71 and lifting of the trailer coupler off the enclosed hitch ball 113.

So, a manner of usage of the exemplary embodiment of the present invention is easily seen from FIGS. 3, 7 and 8. With the claim shell halves 101 and 101' in the open position as in FIG. 3, the trailer and/or stand are moved to position the hitch ball 113 under the coupler 70, and the coupler is lowered onto the hitch ball 113 such that the weight of the trailer tongue is supported by the stand, as shown in FIG. 7. If present, the coupler latch 71 is engaged to secure the coupler 70 onto the hitch ball 113, and the clam shell halves 101 and 101' are raised into their vertical positions until they meet each other, thereby surrounding the coupler on all three sides and on the top, and a hitch receiver pin 50 is inserted into the hitch pin receiver tube 105. The hitch receiver pin is secured into the padlock 51 (not visible in this figures) within the locking system, and the key 52 is removed.

To disengage the anti-theft trailer stand, the process is essentially reversed: unlock and remove the pin 50 using the key 52, splay open the clam shell halves 101 and 101', unlatch 71 the coupler, raise the trailer tongue with the trailer jack to disengage the coupler from the hitch ball, and move the trailer or the stand to allow access to the coupler by a tow vehicle.

Figure 9:
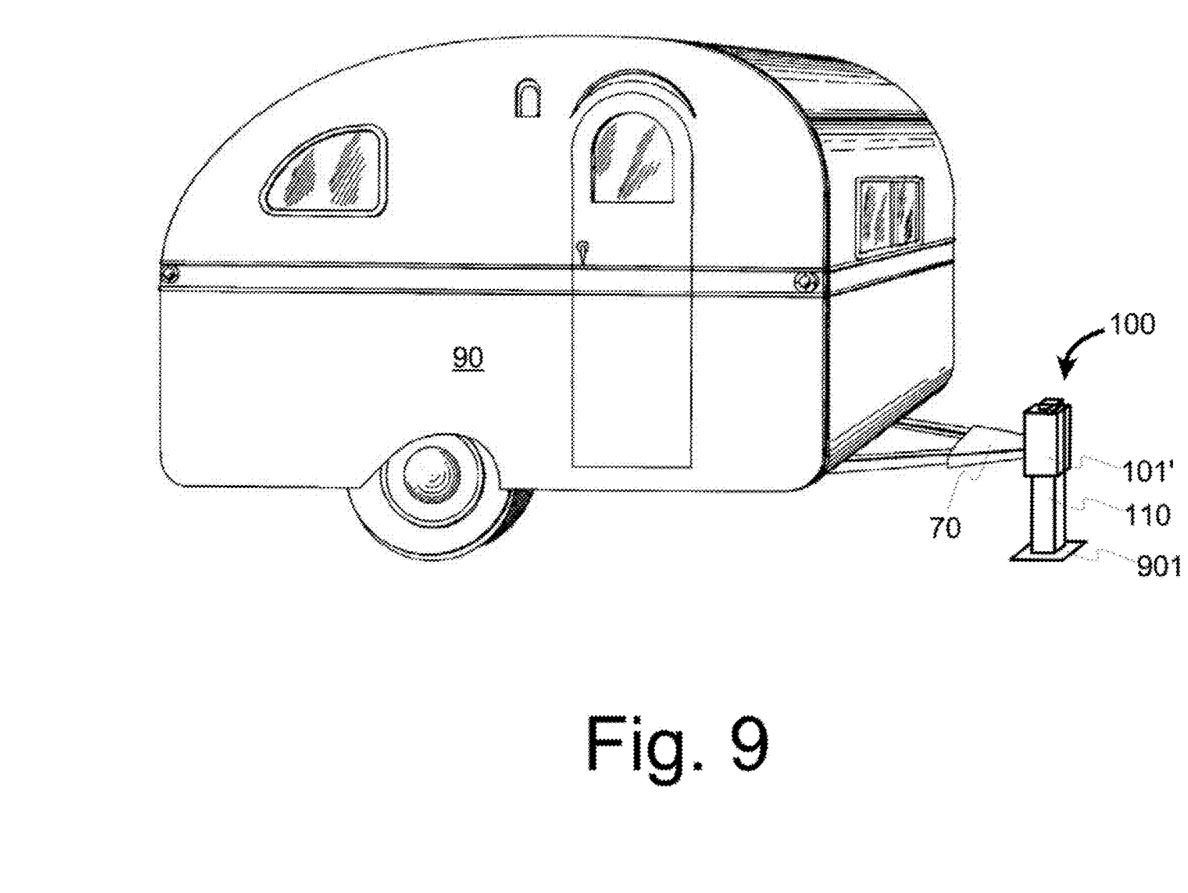
FIG. 9 provides a side-view of a trailer supported by and protected by at least one embodiment of the present invention.

FIG. 9 illustrates a passenger side-view of a trailer supported by, hitched to and protected by at least one embodiment of the present invention. This embodiment provides a unitary post 110 and a flange around the bottom end of the post to provide a surface-mounting foot 901. The foot 901 may be wider than the post to provide support against swaying and tipping of the stand, and may provide for surface attachment means such as holes for bolts into concrete driveways, parking lots, etc. The foot may be left unattached to provide a portable version of the improved trailer stand.

Figure 10:
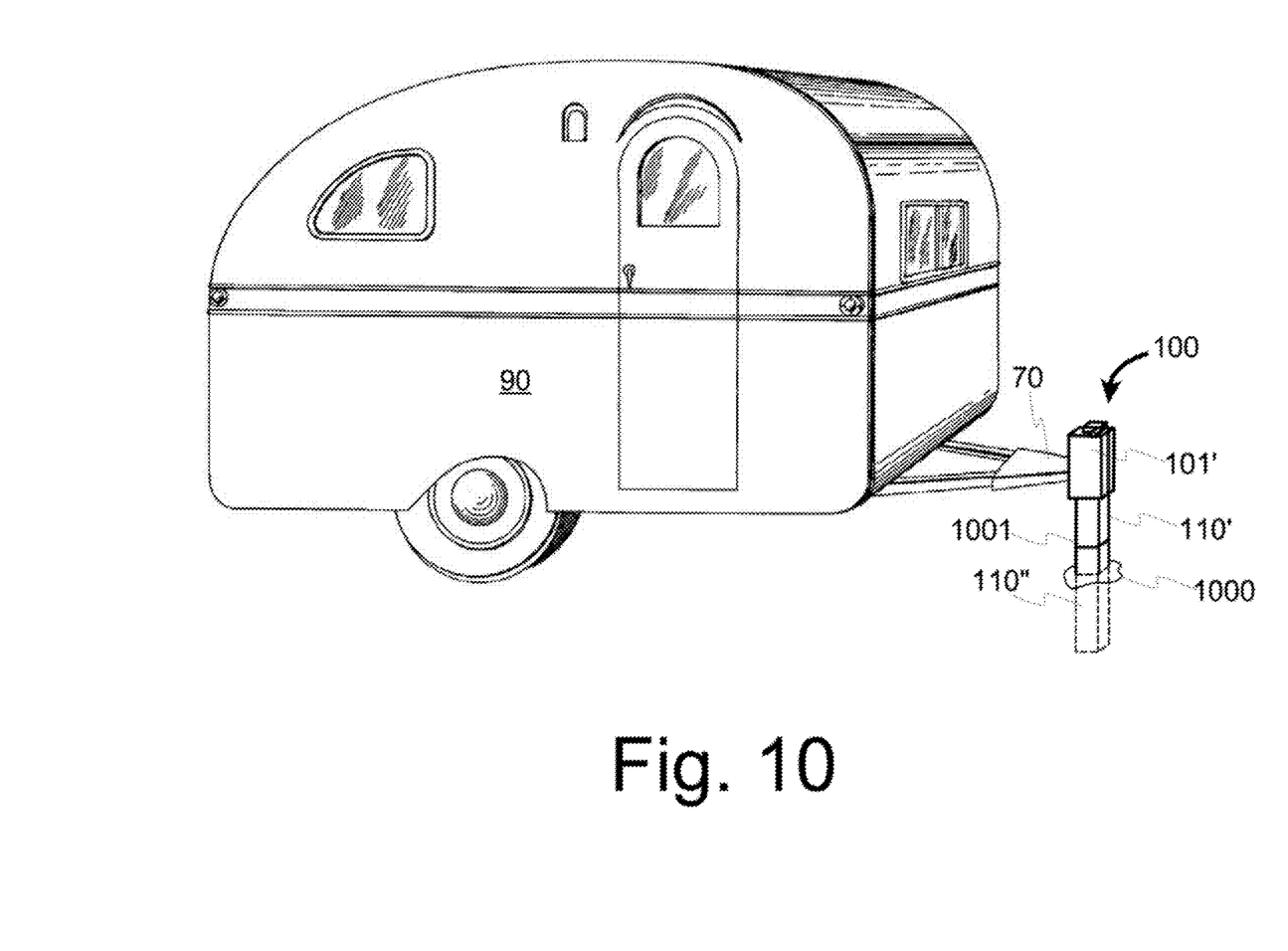
FIG. 10 provides a similar view of FIG. 9, however with a different embodiment of the present invention.
Figure 11:
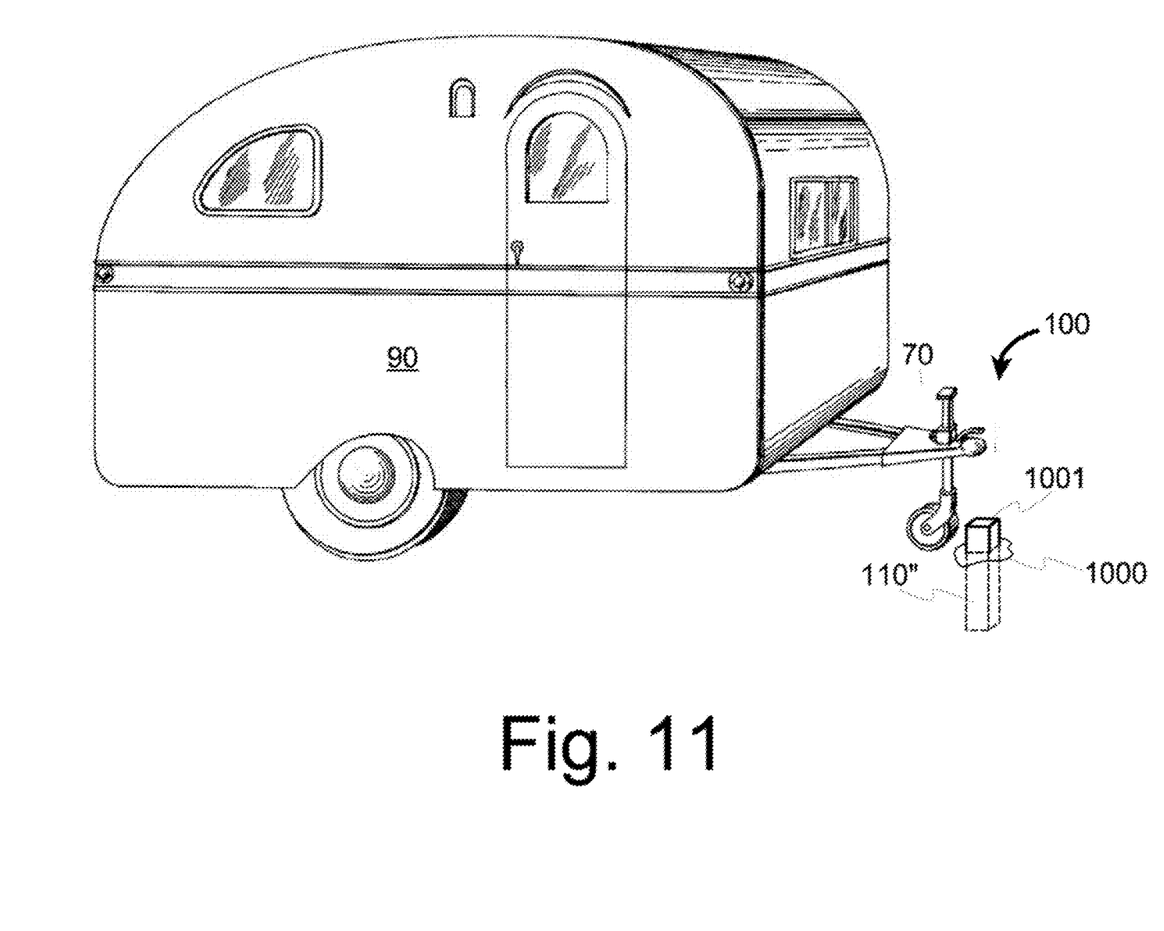
FIG. 11 shows the depiction of FIG. 10 except with the trailer unhitched from the protective stand in one example embodiment and a portion of the stand configured for allowing the trailer to pass over it.

FIG. 10 provides a similar view of FIG. 9, however with a different embodiment of the present invention in which a lower portion 110" of the post is secured into the ground 1000, such as by setting into concrete. In some embodiments, a separation point 1001 may be provided within the post to allow it to be detached or otherwise moved out of the way of the trailer when it is being parked or towed away, such as the depiction of FIG. 11.

Figure 12:
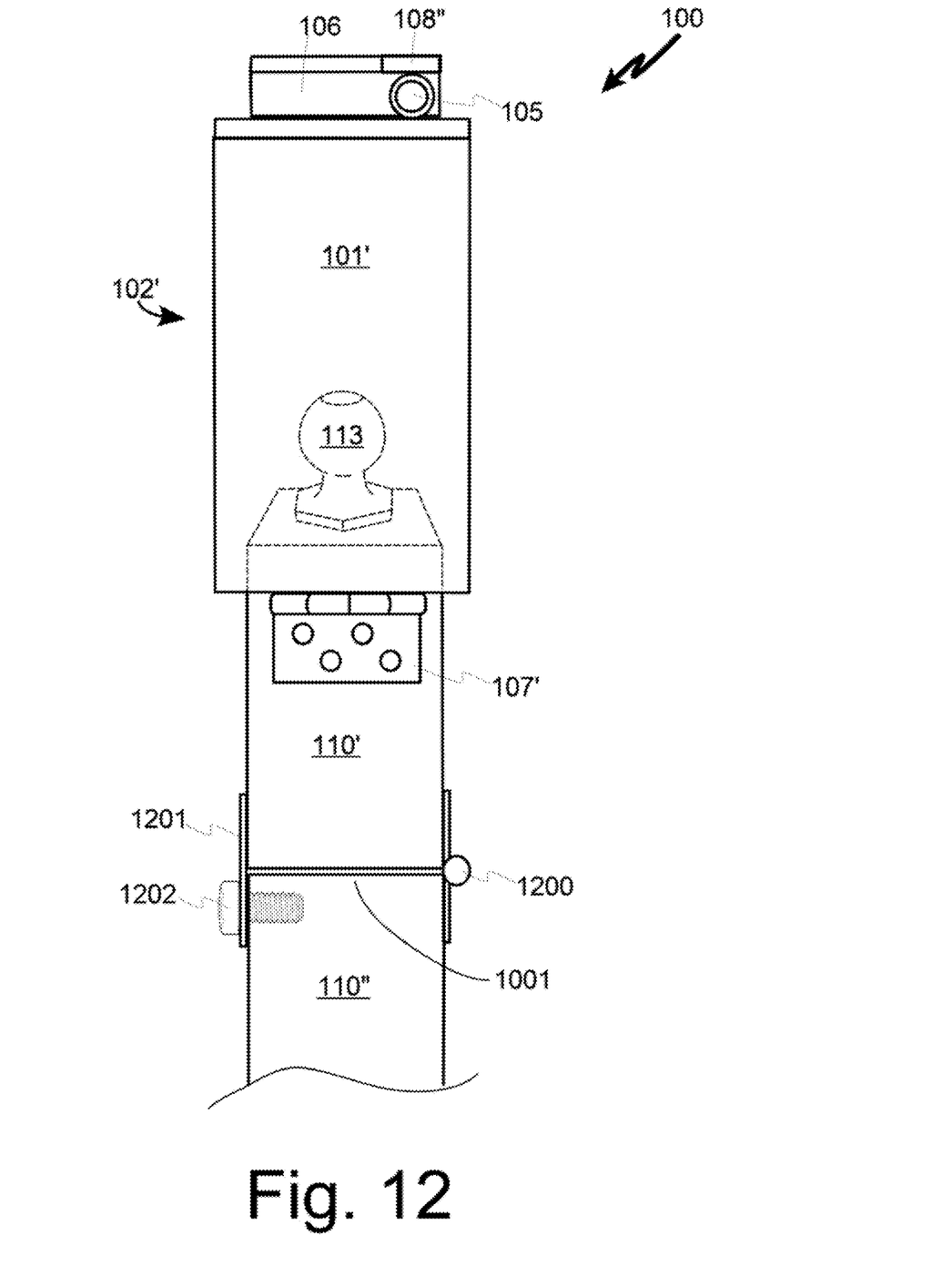
FIG. 12 provides a passenger-side view of at least one embodiment of the present invention with an optional hinged break in the support shaft to facilitate moving the trailer over this particular embodiment.

FIG. 12 provides a passenger side-view of at least one embodiment of the present invention with an optional hinged separation point 1001 in the post to facilitate moving the trailer over this particular embodiment. A hinge 1200 is preferably welded to a lower end of the upper portion 110' of the post and to an upper end of the lower portion 110" of the post. A retention tab 1201 is welded to the lower end of the upper portion of the post 110' such that it extends over the separation point 1001 and over an area of a side of the upper end of the lower portion 110" of the post. The extended portion of the retention tab 1201 can be secured into the lower portion 110" of the post using a suitable bolt 1202 or other device (e.g., linchpin, hasp, etc.)

Figure 13:
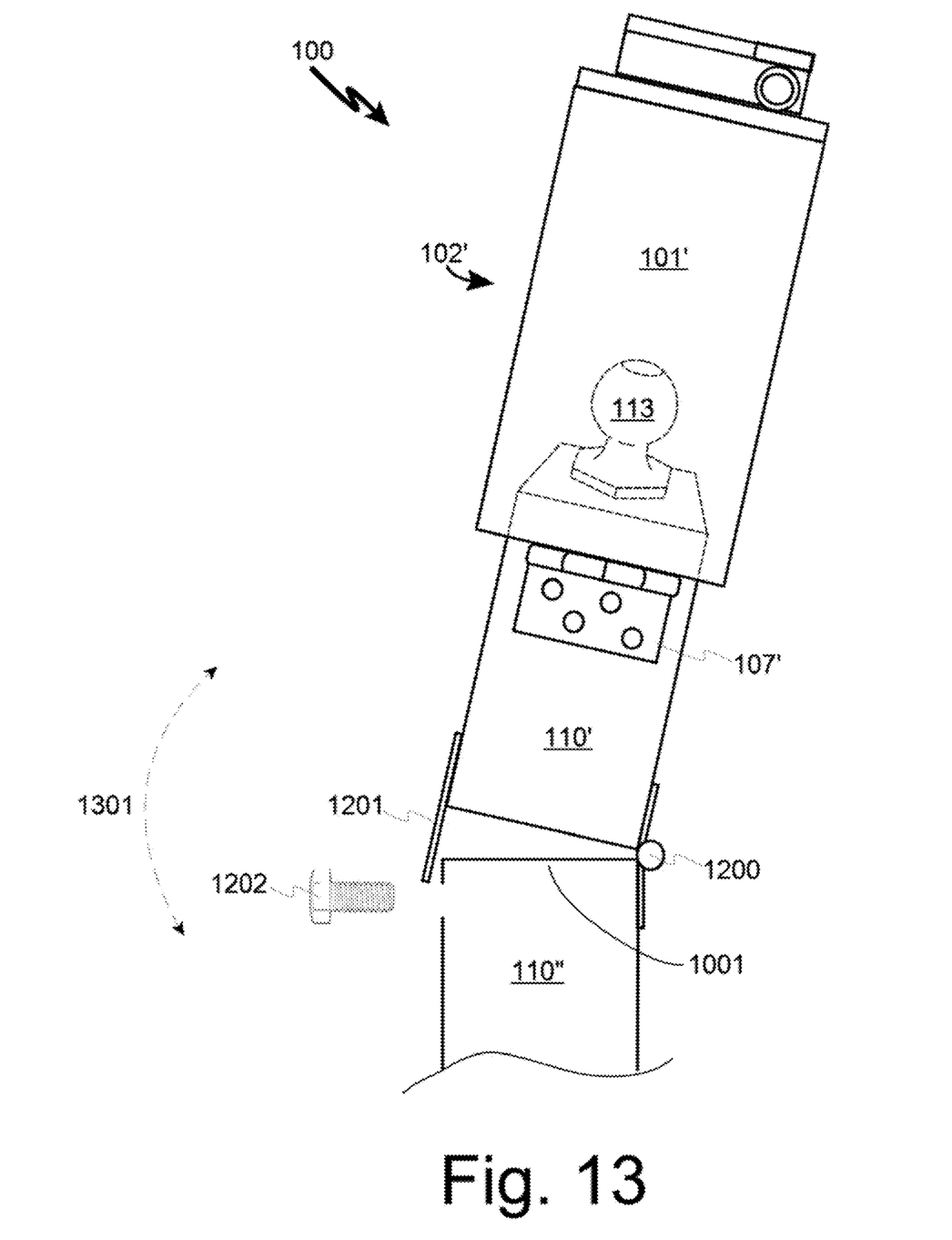

FIG. 13 illustrates the usage of the optional hinged separation point 1000 as shown in FIG. 12. With the securing device such as the bold 1202 removed or disengaged, the protective shell and the upper post portion 110' may pivot 130 down and towards the ground, leaving only a portion of the lower post 110" extending from the driveway, parking lot, or other surface. The height of this configuration is preferably low enough to allow a trailer to pass over it, with the wheels straddling it.

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A trailer anti-theft device comprising:
    a post for supporting weight of a trailer tongue;
    a hitch ball affixed the post configured to receive a trailer coupler of the trailer tongue;
    a protective coupler shell configured to selectively surround the hitch ball, further configured to surround, receive and secure a hitch coupler resting on the hitch ball, and still further configured to be disengaged to allow access to and removal of a hitch coupler from the hitch ball, wherein the protective coupler shell comprises two or more mating shell components which, when mated in a closed configuration, define an interior volume configured to contain the hitch ball; and
    at least one hinge attached to at least one of the shell components and attached to an upper end of the post.

2. The device as set forth in claim 1 further comprising a locking system configured to prevent disengagement of the protective coupler shell except by operation of an unlocking key.

3. The device as set forth in claim 2 wherein the locking system comprises an affixed hitch receiver pin lock and a tube configured to receive a hitch receiver pin into the pin lock.

4. The device as set forth in claim 2 wherein the locking system comprises a hasp and a loop, at least one of which is affixed to the protective coupler shell.

5. The device as set forth in claim 4 wherein at least one of the hasp or loop is affixed to the post, and wherein the protective shell comprises a lift-off shell.

6. The device as set forth in claim 4 wherein the hasp and loop are affixed to at least two or more mating shell components of the protective coupler shell.

7. The device as set forth in claim 1 wherein the post further comprises an upper post portion which is separable from a lower post portion.

8. The device as set forth in claim 7 wherein the upper post portion is configured to be hinged relative to the lower post portion.

\* \* \* \* \*